United States Patent [19]

Kendall

[11] Patent Number: 4,784,551
[45] Date of Patent: Nov. 15, 1988

[54] FASTENING SYSTEM AND METHOD FOR FLUSH AND PROTRUDING HEAD BLIND FASTENERS WITH COMMON PIN AND PARTICULARLY SUCH FASTENERS CONSTRUCTED OF EXOTIC MATERIAL

[75] Inventor: James W. Kendall, Huntington Beach, Calif.

[73] Assignee: Huck Manufacturing Company, Irvine, Calif.

[21] Appl. No.: 930,236

[22] Filed: Nov. 13, 1986

Related U.S. Application Data

[62] Division of Ser. No. 738,080, May 24, 1985, Pat. No. 4,635,310.

[51] Int. Cl.⁴ ............................................. F16B 13/04
[52] U.S. Cl. .................................... 411/43; 411/34
[58] Field of Search ................................ 411/34–38, 411/41, 43–45, 70; 10/11 R, 27 R

[56] References Cited

U.S. PATENT DOCUMENTS

| | | | |
|---|---|---|---|
| 2,526,235 | 10/1950 | Huck | 411/43 |
| 3,285,121 | 11/1966 | Siebol | 411/43 |
| 3,937,123 | 2/1976 | Matuschek et al. | 411/43 |
| 4,230,017 | 10/1980 | Angelosanto | 411/43 |

*Primary Examiner*—Neill Wilson
*Attorney, Agent, or Firm*—Robert F. Hess; Lawrence J. Shurupoff

[57] ABSTRACT

A system for producing a first and second series of blind fasteners each in uniformly varying grip increments for securing workpieces varying in total thickness, each blind fastener comprising a tubular sleeve, a pin and lock collar, the sleeve adapted to be located in aligned openings in the workpieces with the fastener adapted to secure the plurality of workpieces together by means of a relative axial force applied between the pin and the sleeve, the sleeve having a relatively straight sleeve shank terminating at one end in an enlarged sleeve head, the first series sleeve heads being of the flush head type and the second series sleeve heads being of the protruding head type having a generally streamlined low profile configuration, each of the first series of sleeves being related to each of said second series of sleeves of the next largest grip increment such that the overall lengths of the first series of said sleeves and the related ones of the second series of sleeves are substantially the same, the pins for the first series of sleeves and the related ones of the second series of sleeves being substantially the same such that they are interchangeable, and where the fastener pin can be made by cold forming from titanium with a cold formed, tapered stop shoulder.

7 Claims, 4 Drawing Sheets

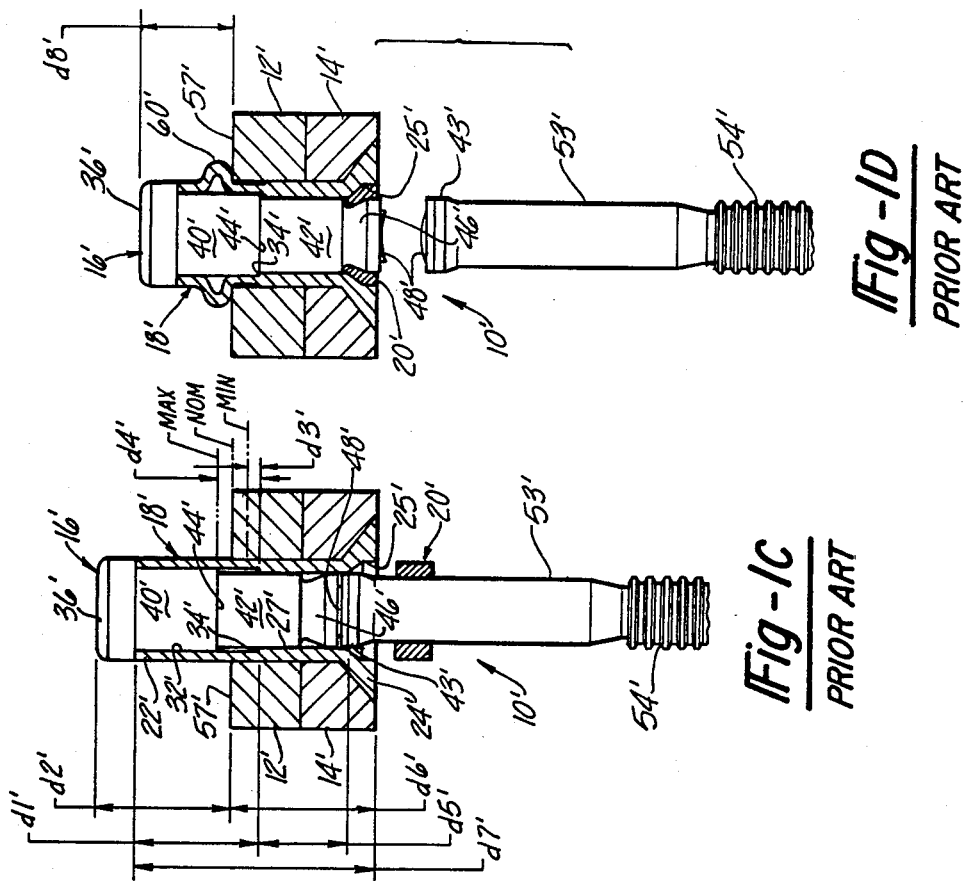
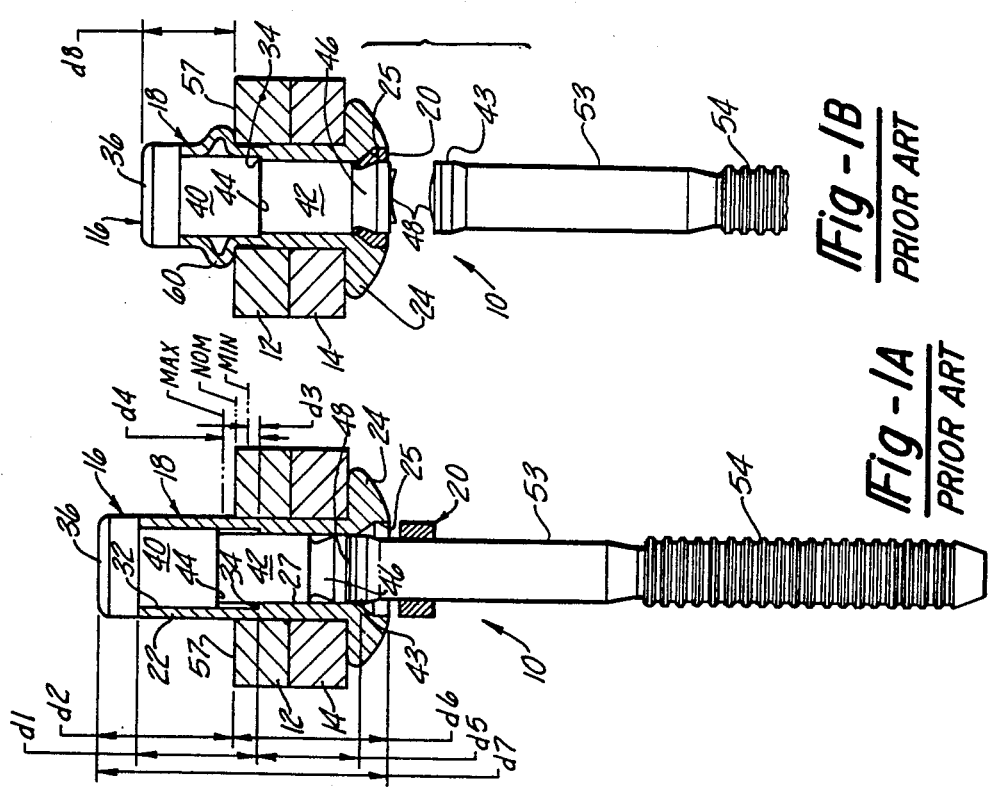

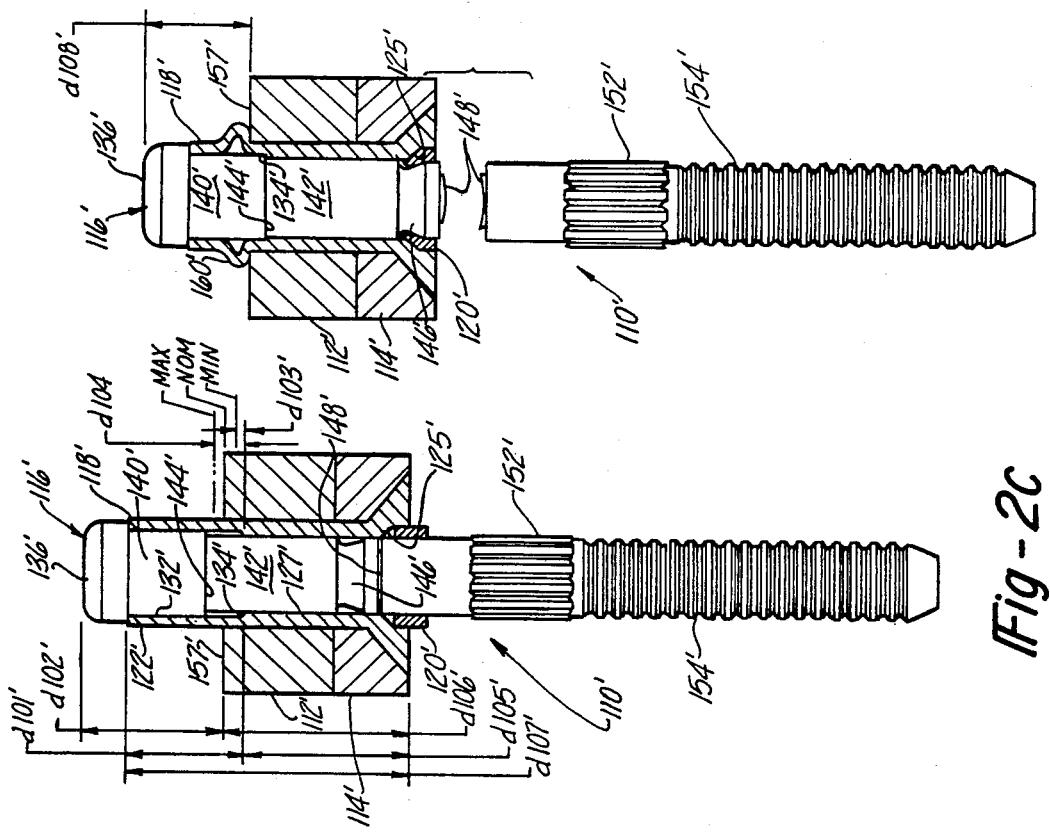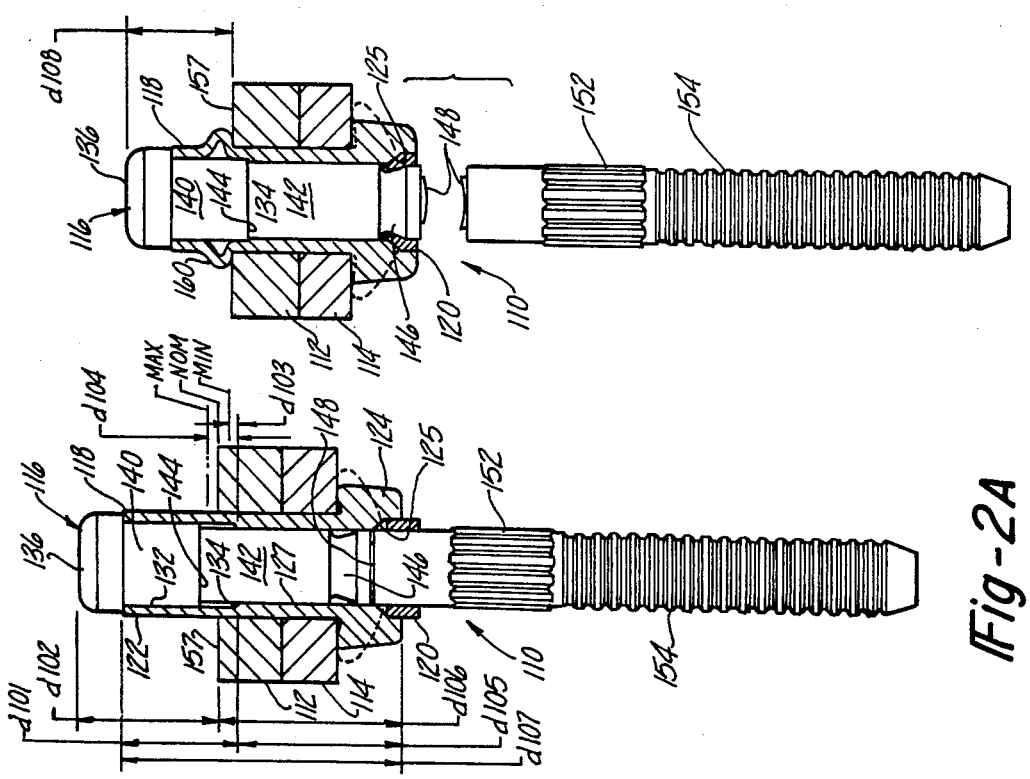

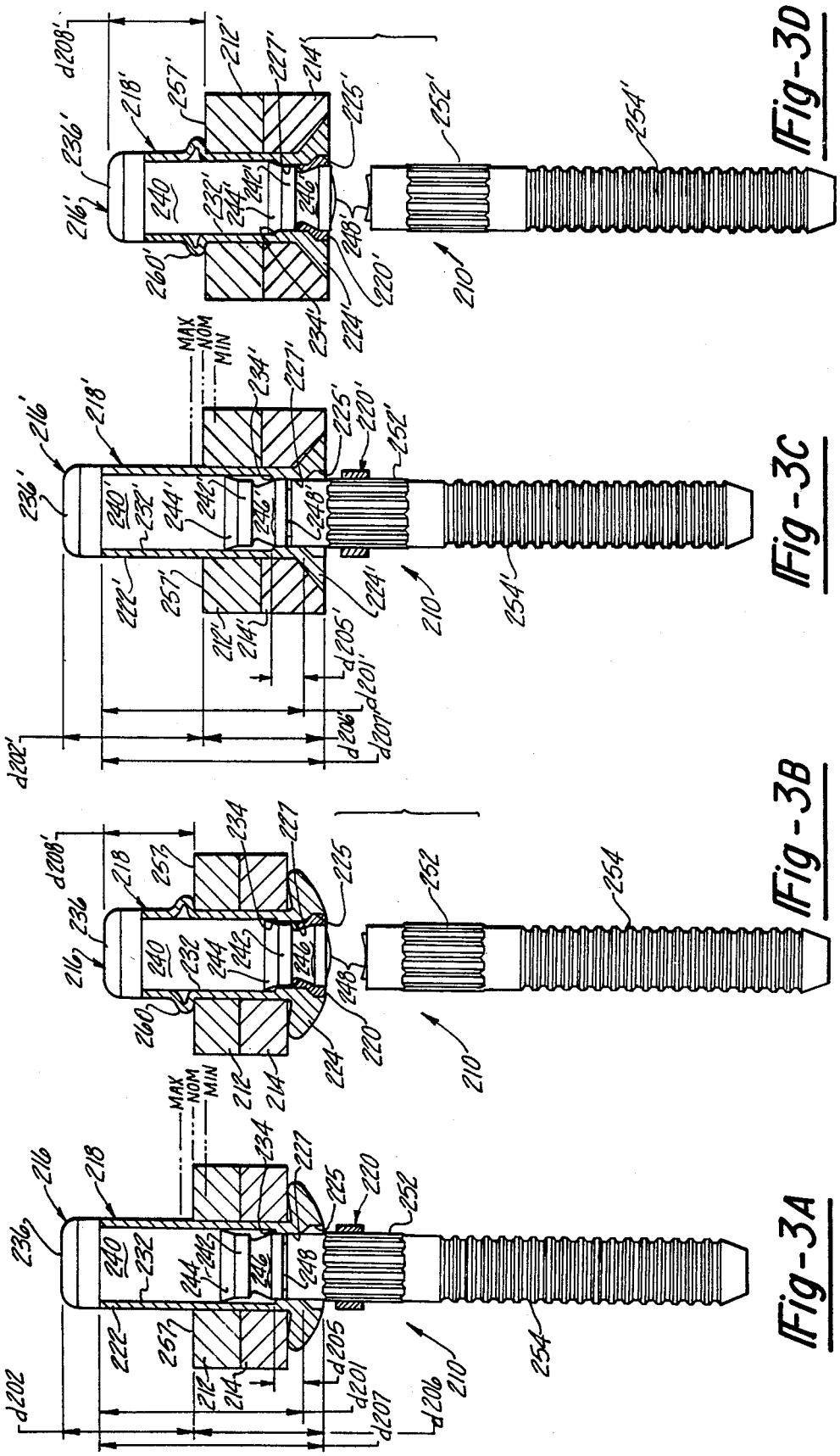

FASTENING SYSTEM AND METHOD FOR FLUSH AND PROTRUDING HEAD BLIND FASTENERS WITH COMMON PIN AND PARTICULARLY SUCH FASTENERS CONSTRUCTED OF EXOTIC MATERIAL

This is a division of U.S. patent application Ser. No. 738,080 filed May 24, 1985, now U.S. Pat. No. 4,635,310, issued Jan. 13, 1987.

SUMMARY—BACKGROUND OF THE INVENTION

The present invention relates to blind fastener structures, a system and a method in which a common pin can be used interchangeably with a flush head sleeve and with a low profile protruding or brazier head sleeve and particularly for fasteners which are manufactured of an exotic material such as titanium The present invention is directed to blind fasteners, namely blind rivets and blind bolts, comprising a pin and a tubular sleeve with the sleeve having a shank and an enlarged head at one end adapted to engage the accessible side of workpieces and with the pin having an enlarged head adapted to engage the opposite end of the shank; a blind head is formed on the inaccessible side of the workpieces in response to a relative axial force applied between the pin and the sleeve. Conventionally the pins are provided with a breakneck groove adapted to fracture at a preselected magnitude of the relative axial force after the blind head has been formed. It is desirable that the fracture occur proximate the outer surface of the sleeve head; to this end the pin and sleeve are provided with stop shoulders adapted to engage and to stop the relative motion between pin and sleeve and, at the same time, to locate the breakneck groove at the sleeve head outer surface. The pin is provided with a lock groove and the sleeve with a lock bore portion in its enlarged head which, when the two are in proper alignment, define a lock pocket adapted to receive a lock collar. In some constructions, the above installation can be performed by a single action tool, see the U.S. Pat. No. 4,432,679 issued Feb. 21, 1984 to Angelosanto et al for "Lock Spindle Blind Fastener for Single Action Application".

In the case of prior blind fastener constructions, whether blind rivets or blind bolts, for a given diameter fastener, the blind side protrusion or clearance of the different sleeves was the same for protruding and flush head fasteners of particular grips when used to join workpieces of a preselected nominal thickness for a given length fastener. In this regard it should be noted that while a particular fastener will be designed to secure a preselected total thickness of workpieces, it will be capable of securing workpieces having a range (grip range) of total thicknesses from a known thickness less (minimum grip) than the nominal thickness (grip) to a known thickness greater (maximum grip) than the nominal thickness. For a given diameter fastener, the nominal grip (designated by numbers 1, 2 . . . ) will vary in uniform steps from one grip to the next; thus for one diameter, the fastener length or usable grip is conventionally varied in 1/16" (0.062") increments, i.e. grips 1 to 4 would be 0.062", 0.125", 0.187" and 0.250", respectively; however, the minimum and maximum grip for that fastener will be on opposite sides of the nominal grip. Thus for example a ¼" diameter fastener could be manufactured in grip lengths 3 (3/16"), 4 (4/16"), etc. The minimum grip for the 3 grip (3/16" or 0.187") fastener will be 0.156" while the maximum grip will be 0.218". Likewise a 4 grip (¼" or 0.250") length fastener will have a minimum grip of 0.218" and maximum grip of 0.281". Thus a different length fastener, and hence a different length pin (and sleeve), will be used for each nominal grip (1, 2 . . . ) but will be operative in a range between each grip.

As noted, the present invention applies to both the blind bolt and blind rivet type fastener. Examples of these can generally be seen from U.S. Pat. No. 3,253,495 issued to J. F. Orloff, May 31, 1966, U.S. Pat. No. 4,127,345 issued to Angelosanto et al, Nov. 28, 1978, U.S. Pat. No. 4,230,017 issued to Angelosanto et al, Oct. 28, 1980, and the prior noted U.S. Patent to Angelosanto (supra); the foregoing patents are incorporated herein by reference. Blind fasteners of these types are commonly provided with two sleeve styles, a flush head sleeve and a protruding head sleeve.

With blind rivets the protruding head version was provided to have a desired low profile, brazier type head (see FIG. 6, Angelosanto et al, U.S. Pat. No. 4,230,017 supra). Conventionally pins of different configurations were used for blind rivet flush head and protruding head sleeves.

Thus with such blind rivets, there was no commonality between pins operative for flush head sleeves and pins operative for protruding head sleeves of the same diameter regardless of grip and thus such prior constructions required the use of different pins to accommodate the sleeves with the different head styles. One factor contributing to the use of different pins was that the blind side clearance or protrusion was maintained the same for a given diameter fastener of the flush and protruding head type for a particular grip. However, the fact that different pins were used required the separate manufacture of each such pin including a separate set up time which can be costly especially on short run items. In addition separate tooling configurations are required for the different pin shapes even if the shapes are only slightly different. While this has been a problem with pins of conventional metals, the problem has been compounded with pins of exotic metals such as titanium. Titanium pins usually require more forming and machining operations than pins of other materials.

With blind bolts, however, a common pin structure has been used for two related sleeves of the flush and protruding head type. Thus it has been known to use a common pin for a flush head and protruding head type sleeve for a blind bolt, and, again, as with the blind rivet noted, the blind side protrusion or clearance was maintained constant between the related blind bolt fasteners. However, in order to properly locate the breakneck groove and the lock pocket, this structure required that a non-uniform and at times excessively enlarged sleeve head be utilized in the protruding head design; this resulted in added material and weight. Further, if the sleeve is also to be manufactured of an exotic material such as titanium the extra material required could result in a significant increase in cost, offsetting any manufacturing gains.

In addition the non-uniform sleeve head was difficult to form and more costly to manufacture because of set up and other factors. Also the sleeve head when enlarged, protruded excessively from the outer workpiece surface with which it was engaged which, in aerospace applications, resulted in an aerodynamically undesirable head thickness or height.

In the present invention, a common pin can be used for sleeves with both head styles with the blind side protrusion varying in order to provide the desired location of the breakneck groove at the outer sleeve head surface and the desired orientation for the lock pocket. The protruding head form, however, is of a desired low profile or brazier type with a significantly reduced protrusion from its engaged workpiece surface. The result is a design permitting economy in manufacture (including set up) and a desired low profile, protruding sleeve head style. Thus the present invention facilitates the use of a common pin for flush and protruding heads for blind rivets while permitting the continued use of the desired streamlined protruding head design and for blind bolts while permitting the adoption of the desired streamlined protruding head design.

With prior blind fasteners, it has been common to locate the sleeve stop shoulder near the blind end of the sleeve shank such that in a minimum grip condition the stop shoulder would be located within the confines of the workpieces but near the rear or blind side sheet line. In this case the wall thickness of the sleeve shank within the workpiece openings was dictated by the extra thickness needed to provide a radial step to define the stop shoulder. In the present invention, the sleeve stop shoulder is located near the enlarged sleeve head. This permits a significant reduction in sleeve thickness generally throughout the length of the sleeve shank. In this latter case, the diameter of the pin shank is increased to accommodate the increase in the sleeve shank diameter resulting from the thickness reduction. Since the pin is constructed of a material having a higher shear strength than that of the sleeve, the resulting fastener will have a higher overall shear strength than the fastener of the prior construction in which the sleeve stop shoulder is located near the blind sleeve shank end.

Also with prior constructions, the bulbing of the sleeve to form the blind head was facilitated by using a work hardened or thermally hardened sleeve with bulbing induced to occur at the rear or blind sheet line over a desirable grip range by annealing the shank end of the sleeve to provide a gradient by hardness. Such a construction and procedure is shown in the U.S. Patent to John Orloff, supra. Thus with such constructions annealing was performed at the same fixed location from the sleeve stop shoulder for both of the related flush and protruding head sleeves having the same diameter. In the present invention, the location of the annealed portion will be different for the related flush and protruding head sleeves relative to the stop shoulders, i.e. using a common pin, and that location is not keyed to the sleeve stop shoulder. Now the annealed portion is located at the rear sheet line position on the sleeve shank for the minimum grip condition. The result of the above is a blind fastener system utilizing a uniform or common pin but with a difference in blind side clearance between the related sleeves of flush and protruding head type.

In the past for high strength, lightweight applications it has not been economically desirable to manufacture sleeves of titanium since the sleeves were made by costly machining operations in which a significant amount of the titanium stock material was lost. With the use of certain forms of titanium, sleeves can be more economically made from titanium by cold forming and the gradient of hardness provided by annealing the work hardened shank in a manner similar to that employed for sleeves of ferrous materials. However, by use of the present invention, an all titanium blind fastener can be manufactured with a substantial savings in manufacturing costs for the pin; in addition the manufacture of sleeves, with uniform head shapes, from titanium lends itself to further economies in manufacturing via cold forming, set up and in material cost via reduced head size.

Thus it is an object of the present invention to provide a blind fastener construction, system and method of the above described type in which a common pin can be utilized for related sleeves with flush and protruding heads resulting in economy of manufacture.

It is another object of the present invention to provide a blind fastener construction, system and method of the above described type in which the blind side protrusion of the fastener will be varied for the same diameter fasteners with sleeves of the different head styles utilizing a common pin construction for each.

It is another object to provide a blind fastener construction in which the sleeve stop shoulder of increased wall thickness is located proximate the sleeve head whereby the remainder of the sleeve shank is of a reduced wall thickness resulting in the pin and sleeve combination of the fastener to have a higher overall shear strength.

It is an object of the present invention to provide a blind fastener in which a hardened sleeve is used and is annealed at the rear sheet line minimum grip position to facilitate bulbing over a desired grip range.

It is another object of the present invention to provide a blind fastener system, method and construction in which a common pin can be used for related protruding and flush head sleeves of the same diameter with the protruding head being uniform for different length sleeves of the same diameter and with the protruding head having a desired low profile configuration.

It is still another object to provide a blind fastener in which a titanium sleeve is manufactured by cold forming with a gradient of hardness provided at the desired shank location by annealing at the rear sheet line minimum grip position to facilitate bulbing over a desired grip range.

It is another object to provide a blind fastener system, method and construction of a substantially all titanium (or other exotic material) construction in which a common pin can be used for related protruding and flush head sleeves of the same diameter and in which the protruding head is of a uniform shape for different length sleeves of the same diameter and with the sleeve being cold formed with the protruding head having a desired low profile configuration.

It is a general object of the present invention to provide a novel blind fastener construction, system and method.

Other objects, features, and advantages of the present invention will become apparent from the subsequent description and the appended claims, taken in conjunction with the accompanying drawings.

BRIEF DESCRIPTION OF THE DRAWINGS

FIGS. 1A–1D are related elevational views, with some parts shown in section, of prior art constructions of a blind rivet fastener of a known (non-common) pin construction and hence with different length pins for protruding and flush head sleeves in which:

FIG. 1A depicts a blind rivet fastener with a pin and a protruding head sleeve in a pre-installed condition with the blind fastener securing workpieces having a total thickness of a first nominal grip for that fastener length;

FIG. 1B depicts the fastener of FIG. 1A after it has been installed;

FIG. 1C depicts a blind rivet fastener with a pin, having a length and configuration different than the pin of FIGS. 1A and 1B, and with a flush head sleeve in a pre-installed condition with the blind fastener securing workpieces having a total thickness of a second nominal grip for that fastener length which is one grip increment greater than the first nominal grip of FIGS. 1A and 1B;

FIG. 1D depicts the blind fastener of FIG. 1C after it has been installed;

FIGS. 2A-2D are related elevational views, with some parts shown in section, of prior art constructions of a blind bolt with a common pin for protruding and flush head sleeves with the protruding head varied in thickness to accommodate the common pin and in which:

FIG. 2A depicts a blind bolt fastener with a common pin and a protruding head sleeve in a pre-installed condition with the blind fastener securing workpieces having a total thickness of the first nominal grip of FIGS. 1A and 1B;

FIG. 2B depicts the blind fastener of FIG. 2A after it has been installed;

FIG. 2C depicts a blind bolt fastener with the common pin of FIGS. 2A and 2B and with a flush head sleeve in a pre-installed condition with the blind fastener securing workpieces having a total thickness of a second nominal grip which is two grip increments greater than the first nominal grip of FIGS. 2A and 2B;

FIG. 2D depicts the blind fastener of FIG. 2C after it has been installed;

FIGS. 3A-3D are related elevational views, with some parts shown in section, of blind bolt fastener constructions of the present invention utilizing a common pin for a standard, low profile protruding head sleeve and a standard flush head sleeve and in which:

FIG. 3A depicts a blind bolt fastener with a common pin and a protruding head sleeve in a pre-installed condition with the blind fastener securing workpieces having a total thickness of the first nominal grip of FIGS. 1A and 1B and with the sleeve head having a standard low profile configuration;

FIG. 3B depicts the blind fastener of FIG. 3A after it has been installed;

FIG. 3C depicts a blind bolt fastener with the common pin of FIGS. 3A and 3B and with a flush head sleeve in a pre-installed condition with the blind fastener securing workpieces having a total thickness of the second nominal grip of FIGS. 1C and 1D which is one grip increment greater than the first nominal grip of FIGS. 1A and 1B and 3A and 3B;

FIG. 3D depicts the blind fastener of FIG. 3C after it has been installed;

As noted, the prior art common pin concept was applied to a blind fastener of the blind bolt type for flush and protruding head sleeves but requiring a non-uniform and at times excessively enlarged head for the protruding head sleeve. However, blind rivets with flush and protruding head sleeves with non-common pins were conventionally constructed with the protruding heads being of the desired low profile shape. Thus FIGS. 1A-1D depict prior blind rivet constructions with one pin for a low profile protruding head sleeve and a non-common, different pin for a flush head sleeve; FIGS. 2A-2D depict a prior common pin concept utilized with blind bolts for a non-uniform protruding head sleeve and a related flush head sleeve; and FIGS. 3A-3D depict the present invention of the improved common pin concept as applied in its preferred form to a blind bolt for a low profile protruding head sleeve and a related flush head sleeve.

Figure 4:
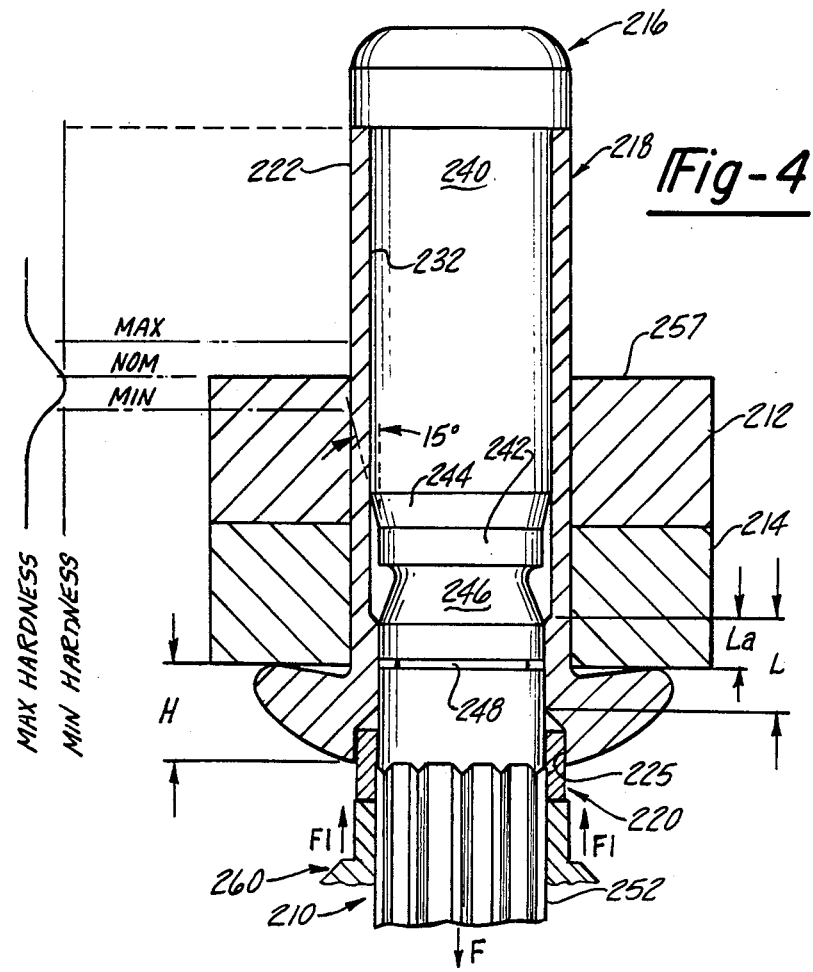
FIG. 4 depicts the blind fastener of FIG. 3A to enlarged scale with the location of the hardness gradient generally shown.

While the above drawings and subsequent description are directed to a blind bolt type of fastener, it should be understood that the features of the invention are also applicable to blind rivets of a similar type construction.

DESCRIPTION OF THE PRIOR ART

FIGS. 1A-1D depict blind rivet fastener constructions for protruding head and flush head sleeves in which separate (non-common) pins for the protruding and flush head types.

Thus, in FIG. 1A, a fastener assembly 10 is shown in conjunction with a pair of workpieces 12 and 14 to be secured together. The workpiece 14 is the front (or open) workpiece and the workpiece 12 is the rear (or blind side) workpiece. The fastener assembly 10 comprises a pin or mandrel 16, a tubular sleeve 18 and an annular lock ring or collar 20.

Figure 5:
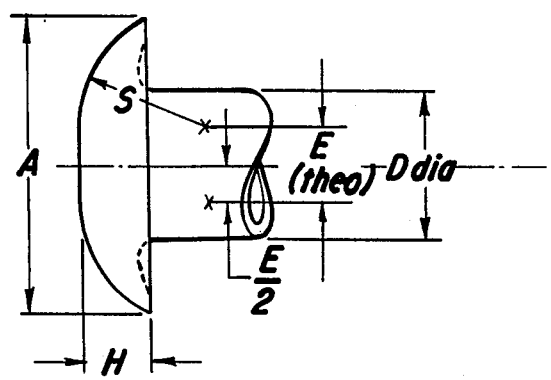
FIG. 5 is a fragmentary view of the protruding sleeve head of FIGS. 3A and 3B showing the desirable low profile, brazier type construction.

The sleeve 18 has a straight shank portion 22 terminating in an enlarged or protruding type head 24. The outside diameter of shank portion 22 is generally uniform along its length. The sleeve 18 has a central through bore which has an intermediate diameter bore portion 27 which terminates at the enlarged head 24 in an enlarged lock bore portion 25 having a conically shaped bore portion and an axially straight side walled counterbore portion. The opposite end of the through bore terminates in a straight, enlarged diameter bore portion 32, which at the juncture with bore portion 27 defines an annular stop shoulder 34. Note that the protruding head 24 is of a desired shape and has a relatively low profile in accordance with the aerospace fastener standard defined by Military Standards Handbook being Mil-Std-1515A, Requirement 106, Table 106-VI (dated Sept. 24, 1979) and that standard is incorporated herein by reference. The latter specification provides a low profile head in accordance with the following table with reference to FIG. 5 (all dimensions are given in inches):

| D Diameter Nominal Size | A Diameter Max. | A Diameter Min. | H Max. | H Min. | S Radius Max. | S Radius Min. | E (Theo.) |
|---|---|---|---|---|---|---|---|
| .062 | .131 | .119 | .037 | .027 | .064 | .044 | .031 |
| .094 | .197 | .178 | .050 | .040 | .092 | .072 | .046 |
| .125 | .262 | .238 | .064 | .054 | .118 | .098 | .062 |
| .156 | .328 | .296 | .077 | .067 | .145 | .125 | .078 |
| .187 | .394 | .356 | .090 | .080 | .174 | .154 | .093 |
| .250 | .525 | .475 | .117 | .107 | .227 | .207 | .125 |
| .312 | .656 | .594 | .143 | .133 | .282 | .262 | .156 |
| .375 | .787 | .713 | .171 | .161 | .338 | .318 | .187 |
| .438 | .918 | .832 | .199 | .189 | .393 | .373 | .218 |

The above relationship applies to both blind rivets and blind bolts of the present invention and, as can be seen, provides for the desired low profile head shape uniformly over the range of fastener sizes. The pin 16 has an enlarged head portion 36 and an elongated shank. The head portion 36 overengages the blind end of sleeve 18. Adjacent to the head portion 36, the pin shank has an enlarged diameter shank portion 40 adapted to be received within enlarged bore portion 32 with a snug fit. An intermediate diameter shank portion 42 follows and is of a smaller diameter generally the same as that on an adjacent expansion land 43. The land 43 is adapted to be received within bore portion 27 with an interference fit to provide a preselected radial expansion for hole fill purposes. Such radial expansion is typical with blind rivets but not provided with the blind bolt structures of the present invention. A pin stop shoulder 44 is defined by the juncture of shank portions 40 and 42 and cooperates with sleeve stop shoulder 34 to terminate movement of the pin 16 during installation of the fastener assembly 10.

An annular lock groove 46 is located adjacent intermediate shank portion 42 and is adapted to define a lock pocket with the enlarged lock bore portion 25 in the sleeve head 24. A concealed or closed annular breakneck or notch 48 is formed in an annular land located adjacent the lock groove 46. Such a breakneck is disclosed in the U.S. Pat. No. 3,292,482, to Fry, and is desired so as to enable the breakneck to move smoothly through annular lock ring 20. A straight shank portion 53 is located between the breakneck groove 48 and an enlongated pull groove portion 54; pull groove portion 54 is comprised of a plurality of annular pull grooves adapted to be gripped by an installation tool in a conventional manner.

The lock ring or collar 20 is an annular split, ring shaped member adapted to be received over the pull groove portion 54 of the pin 16 with a slight interference fit so as to hold the pin and sleeve assembly together prior to installation.

The fastener assembly 10 is adapted to secure workpieces 12 and 14 having a range of combined thicknesses from a minimum (Min) to a maximum (Max). The difference between the minimum and maximum thickness is the nominal "grip" (Nom.) of the fastener.

With the sleeve 18 constructed in accordance with the noted Orloff patent, a gradient of hardness was provided in the sleeve shank portion 22 in order to promote effective bulbing or blind head formation over the desired grip range. Conventionally, the hardness gradient has been provided to extend with increasing hardness from the sleeve stop shoulder 34 towards the blind end. Thus the gradient of hardness was keyed from the sleeve stop shoulder 34. In this regard, the sleeve stop shoulder 34 was positioned such that with the fastener assembly 10 located in the workpiece bores, it would be a distance d3 proximate to the rear sheet line 57 of workpiece 12 at minimum grip (Min) and would be no farther than a desired maximum distance d4 from the rear sheet line for maximum grip (Max). At the same time, the distance d1 from the sleeve stop shoulder 34 to the end of the sleeve shank portion 22 was maintained to be no greater than a preselected maximum in order to minimize the blind side clearance required i.e. the length d2 from the end of pin head 36 to the rear sheet line 57. As will be seen, these constraints i.e. the location of stop shoulder 34 and dimensions d1, d2, d3 and d4 also applied to the prior flush head fastener assembly 10' of FIGS. 1C and 1D.

The flush head fastener assembly 10' is of a construction generally similar to that of the protruding head assembly 10 and thus, like components serving similar functions have been given the same number designation with the addition of a prime and hence the general descriptions thereof will not be fully repeated.

The protruding head blind rivet assembly 10 of FIG. 1A and flush head blind rivet assembly 10' of FIG. 1C are compared because of dimensional similarities between the two. Thus as shown in FIGS. 1A and 1C, the protruding head assembly 10 and the flush head assembly 10' are both designed for the same diameter workpiece openings, i.e. the openings for workpieces 12, 14 are the same diameter as the openings for workpieces 12', 14'. At the same time the total workpiece thicknesses for workpieces 12, 14 and 12', 14' define that nominal grip for the respective fastener assemblies 10 and 10' such that the sleeve head to rear sheet line dimensions (d6, d6') for both nominal grips are the most proximate to each other. Thus both will have the same blind side clearance, i.e. d2=d2', d8=d8'. The protruding head dimension d6, however is greater than the flush head dimension d6'.

Comparing now the protruding head sleeve 18 with the flush head sleeve 18', the styles of enlarged heads 24 and 24' are, of course, different. However in order to provide the same final blind side clearance of the upset blind head, the clearance dimensions d2 and d2' are the same (d2=d2' and hence d1=d1') for both style fasteners. In addition the stop shoulder distances d3 and d3' from the minimum grip rear sheet line will be the same (d3=d3'); likewise the distances of stop shoulder to maximum grip rear sheet line (d4, d4') will be the same (d4=d4'). But since the combined sleeve head and total workpiece thickness dimension d6 from the outer surface of protruding head 24 to the rear sheet line 57 is greater than the similar dimension d6', the overall sleeve lengths d7 and d7' are different. In addition, since the location of stop shoulders 34 and 34' are related to and held constant relative to the position of rear sheet lines 57, 57' at the minimum grip, the shoulder 34 will be located a distance d5 from the related lock bore portion 25 which is farther than the distance d5' of shoulder 34' from lock bore portion 25'. As will be seen the above differences in sleeve dimensions dictates that the pin 16 for sleeve 18 be of a different configuration than pin 16' for sleeve 18'.

Thus the lengths of pins 16 and 16' are slightly different with pin 16 being slightly longer than pin 16'. Even if they were essentially the same, the above differences in sleeve configuration still require that the pins 16 and 16' be of a dissimilar configuration to accommodate the noted differences. In this regard, the protruding head pin stop shoulder 44 will be located farther from its breakneck groove 48 than pin stop shoulder 44' is from its breakneck groove 48'; the latter then requires that the intermediate pin shank portion 42 be longer than the corresponding flush head pin shank portion 42'. Other than that, the protruding head pin 16 and flush head pin 16' are the same (see FIGS. 1A and 1C).

As noted the above variations in sleeves and pins (in addition to head styles) were provided to maintain the blind side clearance dimensions of the pre-installed and upset blind heads the same for the same diameter and same relative grip i.e. nominal grip. To this end, the sleeve stop shoulders (34, 34'), were located at the same distance from their respective rear sheet lines (57, 57') and hence very near the rear sheet lines in minimum grip. The result on the set fastener assemblies can be seen in FIGS. 1B and 1D.

The fastener assemblies 10 and 10′ are set in a manner known in the art (see U.S. patent to Angelosanto et al supra); in general, a relative axial force is applied between the pin (16, 16′) and the sleeve (18, 18′) via the lock collar (20, 20′) causing a blind head (60, 60′) to be formed at the rear sheet line (57, 57′). The pin (16, 16′) travels until its pin stop shoulder (44, 44′) engages the sleeve stop shoulder (34, 34′). At this position the pin lock groove (46, 46′) and sleeve lock bore portion (25, 25′) are in line with each other and the lock collar (20, 20′) is moved into the lock pocket defined thereby. After this occurs, a subsequent increase in the relative axial force results in the pin shank fracturing at the breakneck groove (48, 48′), completing the installation operation. For each increase in grip length the remaining portion of the pin shank secured to the sleeve (18, 18′), i.e. from breakneck groove (48, 48′) to pin head (36, 36′) will increase by that grip length.

In FIGS. 1B and 1D, the fastener assemblies 10 and 10′ are shown to be set at the nominal grip condition with the resultant blind heads 60 and 60′ formed against the rear sheet lines 57 and 57′, respectively. In this case the blind side clearances d8 and d8′ for the blind heads 60 and 60′ for both protruding and flush head fastener assemblies 10 and 10′ are the same. The results of installation at the maximum and minimum grip conditions would be similar with blind heads 60 and 60′ formed against the rear sheet and with the fastener assemblies 10 and 10′ having the same blind side clearance with relation to each other in minimum grip and the same in maximum grip. As noted, the formation of a desired bulbed head (such as 60, 60′) over the grip increment of the fastener (between minimum and maximum total workpiece thickness) is facilitated by the gradient of hardness extending from the sleeve stop shoulder (34, 34a′) towards the blind end of the sleeve shank portion (22, 22′).

Thus fastener assemblies of the above type have traditionally required the manufacture of two different styled sleeves and two different pin configurations. Yet the functional elements of both pins 16 and 16′ are identical and the general dimensional requirements are similar.

It has been known to provide protruding and flush type fastener assemblies for blind bolts in which a common pin could be utilized between related fastener assemblies of the same diameter. Such prior blind bolt constructions are illustrated in FIGS. 2A-2D. Because of the similarities in function between blind rivets and blind bolts, in the assemblies of FIGS. 2A-2D components similar to like components in FIGS. 1A-1D have been given the same numerical designation with the addition of 100 and hence the descriptions thereof have not been fully repeated. Note that in the blind bolts of FIGS. 2A-2D the sleeves are not radially expanded to provide hole fill and hence the pins for the blind bolts of FIGS. 2A-2D do not have expansion lands such as rivet pin lands 46, 46′; in addition, splined portions 152, 152′ are provided on the blind bolt pin shank to retain the locking ring.

The protruding head fastener assembly 110 is matched with the flush head fastener assembly 110′; but, in this case the combined thickness of workpiece 112′ and 114′ for the flush head fastener assembly 110′ was two grip increments longer than that of workpieces 112 and 114 for the protruding head assembly 110. Here the sleeve stop shoulders 134 and 134′ are located the same distance from the rear sheet lines 157 and 157′ (d103=d103′, d104=d104′) and the blind side clearance dimensions are the same (d102=d102′ and d108=d108′). However, in order to provide that the distance from the stop shoulder 134 to the lock bore portion 125 of fastener assembly 110 is the same as the distance from the stop shoulder 134′ to the lock bore portion 125′ of fastener assembly 110′ (d105=d105′), the thickness or height of the protruding head 124 was varied. This located the lock bore portion 125 at the required distance (d105) from the sleeve stop shoulder 134 and permitted the pins 116 and 116′ to be identical. With this construction, the distance from sleeve stop shoulder to the end of the sleeve shank was the same for both fastener assemblies (d101=d101′) and the distance overall from sleeve head to rear sheet line was the same (d106=d106′) and the overall sleeve length was the same (d107=d107′). The latter was accomplished, however, by making the protruding sleeve head 124 substantially thicker than the standard low profile head form shown in phantom. In addition the thickness of the protruding head 124 could vary from one diameter fastener to the next. Thus not only did the head 124 add weight and have a less desirable aerodynamic contour but it was also more difficult to manufacture. As will be seen, the present invention permits the use of a common pin while maintaining the use of the desired low profile, brazier type sleeve head, thus providing the economy of manufacture of the pins while maintaining a sleeve having a head shape which is desirable from a manufacturing, weight, aerodynamic and overall cost point of view.

DESCRIPTION OF THE EMBODIMENTS OF THE INVENTION

A construction exemplifying the features of the present invention is shown in FIGS. 3A-3D where components similar to like components in FIGS. 1A-1D and 2A-2D have been given the same numerical designation with the addition of 200 and hence the descriptions thereof have not been fully repeated.

In considering the utilization of a common pin for both flush head and protruding head sleeves, it was determined that with the prior constructions the pin in either case traveled a predetermined required distance. This was dictated by the requirement to locate the pin lock groove (46, 46′, 146, 146′) in line with the sleeve lock bore portion (25, 25′, 125, 125′) in order to properly define the lock pocket to receive the lock ring (20, 20′, 120, 120′); at the same time this predetermined pin travel would finally locate the breakneck groove (48, 48′, 148, 148′) at a position approximately flush with the outer surface of the sleeve head (24, 24′, 124, 124′).

In the present invention, related protruding and flush head fastener assemblies are utilized where the total thickness of workpieces 212′, 214′ (for flush head fastener assembly 210′ at nominal grip) is one grip increment thicker than the total thickness of workpieces 212, 214 (for protruding head fastener assembly 210 at nominal grip). Next, the overall length of protruding head sleeve 218 and flush head sleeve 218′ are made the same i.e. d207=d207′. Now the sleeve stop shoulders 234 and 234′ are located the same distance from their respective lock bore portions 225 and 225′ i.e. d205=d205′. With this relative relationship, when pin stop shoulder 244 engages the protruding head sleeve stop shoulder 234, the pin lock groove 246 will be properly positioned in confrontation with sleeve lock bore portion 225 to define a lock pocket to receive the lock ring 220. Also the breakneck groove 248 will be located at the top of sleeve head 224 to permit a flush break. Similarly, when the pin stop shoulder 244' engages the flush head sleeve stop shoulder 234', the pin lock groove 246' will be properly positioned in confrontation with the sleeve lock bore portion 225' to define a lock pocket to receive the lock ring 220'. Again the breakneck groove 248' will be located at the top of sleeve head 224' to permit a flush break. Thus the same, common configuration can be used for pins 216 and 216' and hence pins 216 and 216' are interchangeable between protruding head fastener assembly 210 and flush head fastener assembly 210' of the same diameter for the fastener grips noted i.e. one grip increment apart. It is significant, however, that this relationship is provided with protruding sleeve head 224 being of the desired low profile shape defined by the noted Mil-Std-1515A.

The latter pin and sleeve relationships were not provided with the prior art constructions of FIGS. 1A-1D and 2A-2D. Furthermore, with such prior constructions, the blind side clearance, as between flush and protruding head fasteners of the same diameter, was maintained uniform. Thus in FIGS. 1A-1D, the pre-installed blind side clearance d2 for the protruding head assembly 10 at nominal grip was the same as the clearance d2' for the flush assembly 10' at nominal grip; clearance d2 and d2' would continue to be equal for the same relative grips within the grip range of each fastener assembly 10 and 10'. The result was that the installed blind side clearance d8 for the protruding head assembly 10 was the same as the installed clearance d8' for the flush head assembly 10'. The same was true for the fastener assemblies of FIGS. 2A-2D where the pre-installed blind side clearances d102 and d102' were equal as well as the installed blind side clearances d108 and d108'.

In the present invention in order to permit the use of the common pins 216, 216', the blind side clearance of the pre-installed and installed fastener assemblies 210, 210' is no longer held uniform between the two but now has been varied. Thus the pre-installed blind side clearance d202 for the protruding head assembly 210 is slightly less than the related clearance d202' for the flush head assembly 210', i.e. the difference being no more than around one half of its 0.062" grip increment or a difference of around 0.031"; in this regard the combined sleeve head and workpiece thickness dimension d206 is proximate to but slightly greater than flush head dimension d206'. Likewise the installed blind side clearance d208 for the protruding head assembly 210 is slightly less than the clearance d208' for the flush head assembly 210'. This latter relationship necessitates another change relative to the prior constructions.

As noted, in order to effectuate bulbing over a desired wide grip range, the sleeve shank (such as 22, 22' and 122, 122') was annealed to provide a gradient of hardness increasing from the rear sheet line (such as 57, 57', 157, 157') towards the blind end of the sleeve. In order to assure that desired bulbing occurred at the rear sheet, the selective annealing was performed at a position relative to the sleeve stop shoulder (such as 34, 34', 134, 134'). This relative location was the same for both the protroducing head fastener assemblies 10, 10' and the flush head fastener assemblies 110, 110', i.e. d3=d3'=d103=d103' for minimum grip and d4=d4'=d104=d104' for maximum grip.

With the present invention the sleeve stop shoulder 234 for the protruding head sleeve 218 will not be the same distance from the rear sheet line 257 as the sleeve stop shoulder 234' for the flush head sleeve 218'. Thus, unlike the prior constructions, the location of the annealed portion or gradient of hardness must be varied between the protruding head sleeve 218 and the flush head sleeve 218'. In the present invention, the sleeves are annealed at a location determined by the anticipated location of the rear sheet line at the minimum grip condition for that sleeve diameter and overall grip. This will vary between related protruding and flush head sleeves of the same diameter with interchangeable or common pins and will not be uniform therebetween with regard to the location of the respective sleeve stop shoulders. A representation of the hardness gradient for the sleeve 218 for fastener 210 is shown in FIG. 4. Thus the hardness gradient will begin at a position relative to the minimum sheet line and will provide a minimum hardness at a point just beyond the minimum grip sheet line location towards the nominal grip sheet line location. This is to facilitate the initiation of bulbing at a point just slightly away from the rear sheet line at minimum grip. The hardness gradient continues to inrease to maximum hardness at a location beyond the maximum grip sheet line to provide a sufficient gradient at maximum grip to facilitate bulbing near the rear sheet line.

With the annealing and resultant gradient of hardness now located relative to the location of the minimum grip sheet line, the sleeve stop shoulder need not be positioned at a location adjacent to the location of the rear sheet line for the minimum grip condition. In fact the sleeve stop shoulders 234, 234' can now be located, as noted, proximate the enlarged sleeve head 224, 224'. With this construction, the sleeve shank 222, 222' will be defined substantially by the nelarged bore portion 232, 232' and hence will have a thin wall for generally all of its length within the workpiece bores. At the same time the common pins 216, 216' will have a correspondingly greater length of the enlarged diameter shank portion 240, 240' within the sleeves 218, 218' and within the confines of the workpiece bores. Since the pins 216, 216' are of a material having a higher ultimate shear strength than the sleeves 218, 218' the result will be a fastener having a higher overall ultimate shear strength within the confines of the workpiece bores. It has been found desirable to provide the sleeve shanks 222, 222' to have the enlarged diameter bores 232, 232' and hence reduced wall thickness throughout its entire length to within a distance La from sleeve head 224, 224' of around 25% of the fastener diameter; thus for a fastener 210, 210' having an outside diameter of 0.250 inches at sleeve shank 222, 222' the distance La will be 0.0625 inches. The reduced or minimum wall thickness will be determined by the thickness required to satisfactorily form an adequate blind head (260, 260'); for a 5/32" diameter fastener such wall thickness will be between around 0.013" to 0.014", for a 3/16" diameter fastener it will be between around 0.016" to 0.0175", for a ¼" diameter fastener it will be between around 0.020" to 0.022" and for a 5/16" diameter fastener it will be between around 0.0245" to 0.0265".

The fastener assemblies 210 and 210' are blind bolts of the single action type shown and described in the co-pending U.S. patent application of J. Kendall, Ser. No. 393,488, filed June 29, 1982, entitled Lock Spindle Blind Bolt with Lock Collar Providing Pin Stop Support and the disclosure of that application with regard to a blind bolt construction is incorporated herein by reference. Likewise with regard to the application of the present invention to blind rivets the disclosure of Angelosanto, supra which relates to blind rivets, and to some extend blind bolts as well, is incorporated herein by reference. Thus, with the present invention, all of the setting loads are applied between the sleeve 218, 218' and the pin 216, 216' via the lock collar 220, 220' with the final positioning of the pin 216, 216' being assisted by the engagement of the pin stop shoulder 224, 224' with the sleeve stop shoulder 234, 234'.

For the reasons given above, it is advantageous to locate the sleeve stop shoulder 234,234' as proximate to the sleeve head 224, 224' as possible in order to maximize the ultimate shear strength of the resultant For the reasons given above, it is advantageous to locate the sleeve stop shoulder 234,234' as proximate to the sleeve head 224, 224' as possible in order to maximize the ultimate shear strength of the resultant fastener. With prior constructions in which the lock collar (such as 220, 220') was set by a double acting tool or by the use of special lock collars having a shear flange or a separate shear cap, the setting loads were not applied through the lock collar in direct engagement with the sleeve lock bore portion (such as 225, 225') until the blind head had been formed and the pin stop shoulder (such as 224, 224') had engaged the sleeve stop shoulder (such as 234, 234') and the setting loads had attained a predetermined magnitude. With the present invention the pin stop shoulder 224, 224' need not provide nearly as much of the stopping force on the pin as with prior constructions, since the setting force is applied solely through the lock collar 220, 220' which is in instant engagement with the lock pocket when it is defined. Thus as seen from the prior constructions of FIGS. 1A-1D and 2A-2D, the stop shoulders 44, 44', 144 and 144' were all sharply constructed transversely to the pin axis. This required careful and costly forming operations on the pin. Such is not required with the present invention. Thus in the present invention, the pin stop shoulders 244, 244' are of a generally tapered construction following the reduced diameter portion 242, 242'. This tapered structure being now generally non-critical can be formed directly in a heading or cold forming operation. The angle of taper of shoulder 244 is generally from around 15 to around 20 degrees with the pin axis. This relatively shallow angle will provide radial expansion of the sleeve shank 222 to provide hole fill with the confronting workpiece bore; at the same time it will provide a tight frictional engagement with the sleeve stop shoulder 234. The result will be a construction having good fluid sealing characteristics between the sleeve and workpiece bores and pin and sleeve.

In the present invention the sleeve stop shoulder 234, 234' can be considered to be defined by a short axially extending rib which is radially in line with the sleeve shank 222, 222' for only a short distance with the remainder of the rib being radially in line with the enlarged sleeve head 224, 224'. Thus, radial expansion of the sleeve will most readily occur for only a short axial distance before continued radial expansion will be resisted by the significantly increased radial stiffness of the sleeve head 224, 224'. However, with this potential movement into the sleeve head 224, 224', in the event of slight dimensional variations, self correction could occur resulting in proper alignment or only minor but tolerable misalignment of the sleeve lock bore portion 225, 225= and pin lock groove 246, 246' and of the breakneck 248, 248' relative to the end of the sleeve head 224, 224'. In one form of the invention, the rib defining the stop shoulder 234, 234' has no more than around one half of its axial length L extending beyond the sleeve head 224, 224' rearwardly into the confines of the sleeve shank 222, 222' i.e. La=½L; the remainder of the rib is generally located within the confines of the sleeve head 224, 224'. Approximately at least around one half of its axial length L is desired to extend rearwardly for fluid sealing purposes. The above relationship was defined for a fastener such as 210 which was a 3/16 inch diameter (sleeve shank 222) fastener with the rib length L being 0.070 inches and the distance La of the shoulder 234 (rib) extending beyond the sleeve head 224 being around 0.035 inches.

While an all titanium blind fastener was considered desirable the cost for pins in manufacturing was a deterrent. In addition sleeves were not readily formed by cold forming. But, even with a cold formed titanium sleeve, the prior common pin concepts results in a heavier more expensive and less desirable sleeve head structure. With the present invention the benefits of a common pin can be realized without compromising the benefits of a sleeve which is cold formed from titanium.

In this regard, it has been found that certain titanium alloys, such as a metastable beta material, can be more readily cold formed to the desired sleeve shape and subsequently annealed to provide the desired hardness gradient. An example of one such titanium alloy is Ti—15-3 Ti—15V—3Cr—3Sn—3Al) produced by Timet or Dynamet, Inc.

Since the above noted titanium material can be cold formed it can also be advantageous to manufacture the pin from such material. In addition, the sleeve could be cold formed from CP (chemically pure) titanium. In one form, an all titanium blind fastener was constructed by cold forming the pin from the beta type material and the sleeve from CP (chemically pure) titanium. Because of the thin walls to which the sleeves 218, 218' are constructed the use of the above noted materials are especially advantageous for manufacturing. The CP titanium sleeve can have an ultimate shear strength of between around 20 KSI to around 45 KSI; the titanium pin of beta material can have an ultimate shear strength of between around 80 KSI to around 115 KSI. While the latter relative shear strengths, in the extreme, would provide a ratio of pin shear strength to sleeve shear strength of from around 6:1 (six to one) to around 2:1 (two to one) the more typical ratios would be between around 3:1 (three to one) to around 4:1 (four to one). In any event, the preceding demonstrates the desirability of maintaining the sleeve wall as thin as possible for as much of the sleeve shank length as possible; this permits the overall shear strength of the fastener to be maximized by virtue of the resultant greater percentage of the higher strength pin in the cross section of the pin-sleeve combination.

Thus a fastener construction and method have been provided which permits the use of a common pin between related protruding and flush head sleeves without compromising the benefits of construction and manufacture of low profile protruding head sleeve and resulting in an improvement in manufacturing efficiency of pin and sleeve and a reduction in pin inventory. Also a construction is shown in which the overall ultimate shear strength of the pin-sleeve combination is increased; in this regard the sleeve stop shoulder is defined by a short web located near the sleeve head; with a single action type construction, the pin stop shoulder can be tapered to provide good fluid sealing characteristics. In addition a construction is shown in which the sleeve can be constructed of an exotic material such as titanium which can be cold formed to have the desired thin wall sleeve with a gradient of hardness provided by annealing the cold worked sleeve shank at the desired location. Finally an all titanium fastener can be economically manufactured.

While it will be apparent that the preferred embodiments of the invention disclosed are well calculated to fulfill the objects above stated, it will be appreciated that the invention is susceptible to modification, variation and change without departing from the proper scope or air meaning of the invention.

What is claimed is:

1. In combination a blind fastener and a pair of flat, plate-like workpieces varying in total thickness from a preselected minimum total thickness to a preselected maximum total thickness being clamped together by said blind fastener, said fastener adapted to be set by a tool applying a relative axial force to the fastener, said blind fastener comprising a tubular sleeve adapted to be located in aligned openings in the workpieces, a pin and a separate lock collar axially slidably mounted on said pin adapted to secure the pair of workpieces together by means of the relative axial force applied by the tool between said pin and said sleeve, said sleeve having a relatively straight sleeve shank terminating at one end in an enlarged sleeve head, said sleeve having a through bore including an enlarged diameter bore portion at its opposite end, an intermediate reduced diameter bore portion and an enlarged conical bore portion at said enlarged sleeve head, a sleeve stop shoulder defined by the juncture of said enlarged and intermediate bore portions, said pin having a pin shank terminating in an enlarged pin head at one end and being adapted to be assembled to said sleeve with said pin head overengaging said sleeve shank at said opposite end, said pin having an enlarged diameter shank portion of a diameter to be received within said enlarged bore portion and having a intermediate shank portion of reduced diameter to be received within said intermediate bore portion, a pin stop shoulder defined by the juncture of said enlarged and intermediate pin shank portions, an annular lock groove located adjacent to said intermediate pin shank portion, said pin stop shoulder located a preselected distance from said lock groove such that upon engagement with said sleeve stop shoulder said lock groove will be located in radial alignment with said conical bore portion to define a lock pocket, said lock collar being generally annular and adapted to be located within said conical bore portion, said pin in response to said relative axial force moving axially relative to said sleeve causing said enlarged diameter bore portion to bulb forming a blind head at the blind side of the workpieces, said pin continuing to move in response to said relative axial force until said pin shoulder engages said sleeve shoulder to initially stop further axial pin movement, said enlarged diameter pin portion and said intermediate diameter pin portion being of diameters adapted to be generally received in engagement with the corresponding one of said enlarged bore portion and said intermediate bore portion, respectively, said lock collar being urged into engagement with said pin by the relative axial force and being moved into said lock pocket to lock said pin and said sleeve together, said pin having a breakneck groove located a preselected distance from said pin stop shoulder whereby said breakneck groove will be located adajcent the outer surface of said sleeve head when said pin stop shoulder and said sleeve stop shoulder are engaged, said breakneck groove severing at a preselected magnitude of said relative axial force after said lock collar has been set, said pin stop shoulder being inclined at an angle of between 15 to around 20 degrees relative to the axis of said pin, said sleeve stop shoulder being defined by a rib extending axially inwardly from said conical bore portion a distance of around 0.50 of the outside diameter of the shank, said pin having a higher shear strength than said sleeve, the wall thickness (T) of said sleeve in said enlarged diameter bore portion being made to a minimum, said sleeve stop shoulder being located from said sleeve head a distance of around 0.25 of the outside diameter of said sleeve shank and within the thickness of the workpiece engaging said sleeve head whereby the sleeve is of minimal thickness at the shear line comprising the juncture of the said pair of workpieces so as to thus maximize the overall shear strength of said pin and said sleeve.

2. The combination of claim 1 wherein, said minimum wall thickness (T) relative to the outside diameter (D) of said sleeve shank being generally defined in inches by the following:

| D (outside diameter) Diameter Nominal Size | T Wall Thickness |
| --- | --- |
| .156 | .013 to around .014 |
| .187 | .016 to around .017 |
| .250 | .020 to around .022 |
| .312 | .0245 to around .0265. |

3. The combination of claim 2 with the ultimate shear strength of said pin and said sleeve being in a ratio of between around 3:1 to around 4:1.

4. The combination of claim 2 with said sleeve head being of a protruding head type with the configuration of said sleeve head being generally defined in inches by the following:

| D Diameter Nominal Size | A Diameter Max. | A Diameter Min. | H Max. | H Min. | S Radius Max. | S Radius Min. | E (Theo.) |
| --- | --- | --- | --- | --- | --- | --- | --- |
| .062 | .131 | .119 | .037 | .027 | .064 | .044 | .031 |
| .094 | .197 | .178 | .050 | .040 | .092 | .072 | .046 |
| .125 | .262 | .238 | .064 | .054 | .118 | .098 | .062 |
| .156 | .328 | .296 | .077 | .067 | .145 | .125 | .078 |
| .187 | .394 | .356 | .090 | .080 | .174 | .154 | .093 |
| .250 | .525 | .475 | .117 | .107 | .227 | .207 | .125 |
| .312 | .656 | .594 | .143 | .133 | .282 | .262 | .156 |
| .375 | .787 | .713 | .171 | .161 | .338 | .318 | .187 |
| .438 | .918 | .832 | .199 | .189 | .393 | .373 | .218 | where:
A is the outside diameter of said sleeve head,
H is the maximum height of said sleeve head,
D is the outside diameter of said sleeve shank,
E is a theoretical, empirical number defining the spacing of two equally spaced lines parallel to the axis of said sleeve, and S is the radius of a pair of arcs each having its center located on a different one of said spaced lines a distance S from a line defining the axially outermost end of said sleeve head.

5. The combination of claim 4 wherein:

D is the outside diameter of said sleeve shank,

E is a theoretical, empirical number defining the spacing of two equally spaced lines parallel to the axis of said sleeve, and S is the radius of a pair of arcs each having its center located on a different one of said spaced lines a distance S from a line defining the axially outermost end of said sleeve head, the ultimate shear strength of said pin and said sleeve being in a ratio of between around 3:1 to 4:1.

6. The combination of claim 1 wherein said pin being generally cold formed from a titanium beta type alloy, said pin stop shoulder being cold formed, said relative axial force being applied by an installation tool by a pulling force on said pin and a reaction force on said sleeve solely through said collar against said conical bore portion.

7. The combination of claim 6 wherein said sleeve being generally cold formed from titanium and having an ultimate shear strength of between around 20 KSI to around 45 KSI with said pin having an ultimate shear strength of between around 80 KSI to around 115 KSI.

* * * * *

UNITED STATES PATENT AND TRADEMARK OFFICE
CERTIFICATE OF CORRECTION

PATENT NO. : 4,784,551
DATED : November 15, 1988
INVENTOR(S) : James W. Kendall

It is certified that error appears in the above-identified patent and that said Letters Patent is hereby corrected as shown below:

Title, first line delete "AND METHOD".

Column 2, line 64, "fastors" should read "factors".

Column 7, line 42, after "the" (first occurrence) insert -- "grip range" of the fastener. The average combined thickness is the --.

Column 11, line 26, after "flush" insert -- head --.

Column 12, line 22 "inrease" should read "increase".

Column 12, line 34 "nelarged" should read "enlarged".

Column 13, line 2 "extend" should read "extent".

Column 16, line 4 "adajcent" should read "adjacent".

Column 17, lines 6 through 15 delete entirely.

Signed and Sealed this

Fourth Day of July, 1989

Attest:

DONALD J. QUIGG

*Attesting Officer*      Commissioner of Patents and Trademarks